Aug. 6, 1968    E. S. MENDELSON    3,395,697
ACOUSTIC REFLEXOMETER

Filed Dec. 8, 1965

INVENTOR.
EMANUEL S. MENDELSON

BY *H. H. Loscke*
ATT'YS.

United States Patent Office 3,395,697
Patented Aug. 6, 1968

3,395,697
ACOUSTIC REFLEXOMETER
Emanuel S. Mendelson, Harleysville, Pa., assignor to the United States of America as represented by the Secretary of the Navy
Filed Dec. 8, 1965, Ser. No. 512,560
4 Claims. (Cl. 128—2)

ABSTRACT OF THE DISCLOSURE

An apparatus for simultaneously detecting the hearing ability and tympanic membrane reflex motion of a human subject in response to pulsed acoustical stimuli comprising a motor-driven, swept-frequency audio signal generator coupled, via a multivibrator-gated electronic switch means and a variable attenuator, to an amplifier which drives a transducing means to produce the acoustical stimuli in the vicinity of the subject's external auditory canal. A manometer means including a differential pressure meter, a gas pressurized tube system having a catheter tip suitable for insertion in the subject's external auditory canal via the ear opposite the transducing means, and a highly accurate pressure calibrator means is provided for producing an electrical output signal proportional to the subject's tympanic membrane movements in response to the acoustical stimuli. A multichannel recorder is coupled to the amplifier driving the transducer for recording the acoustical stimuli, to the manometer means for recording the subject's tympanic membrane movements in response thereto, and to a pushbutton circuit for recording manual action thereof by the subject whenever he hears an audible tone.

The invention described herein may be manufactured and used by or for the Government of the United States of America for governmental purposes without the payment of any royalties thereon or therefor.

Background of the invention

This invention relates to a combination to be used in physiological acoustical research, and more particularly to a combination which permits standardized comparisons of middle ear muscle reflex reactions, using auditory stimulation and tympanomanometric response measurement.

In research of the function of the middle ear muscles, namely the stapedius and the tensor tympani, it was found that movement of these muscles causes motion of the tympanic membrane. Predominant contraction of the stapedius muscle presses the ossicles of the middle ear against the tympanic membrane causing it to protrude slightly into the external auditory canal, and predominant contraction of the tensor tympani muscle pulls the tympanic membrane inwardly. Prior to this invention middle ear muscle research was subject to many inaccuracies, due to nonrepeatable testing techniques and spot check techniques, which prevented co-ordination and reliable interpretation of the resulting data. Part of the problem of analyzing data from any tests of this type arises because the resultant memberane movement due to a particular acoustical stimulus is not the same from day to day.

To overcome these problems this invention utilizes acoustic change as a primary condition of the stimuli and thereby produces continuous data which may be analyzed and compared. One example of what is meant by "acoustic change" would be a pulsed signal, where the frequency of the signal during each successive pulse increases or decreases. It is therefore a general object of this invention to provide a testing means to be used in research of the middle ear muscles. This testing means must be capable of being operated by the researcher on himself or on another, and it must yield manometrically detected tympanic membrane reflex motion data due to acoustical stimuli, a primary condition of which is acoustic change.

Brief description of the drawings

This and other objects, features, and uses of this invention will become more apparent to those of ordinary skill in the art as the detailed description proceeds when considered along with the accompanying drawings, in which.

Description of the preferred embodiment

Figure 1:
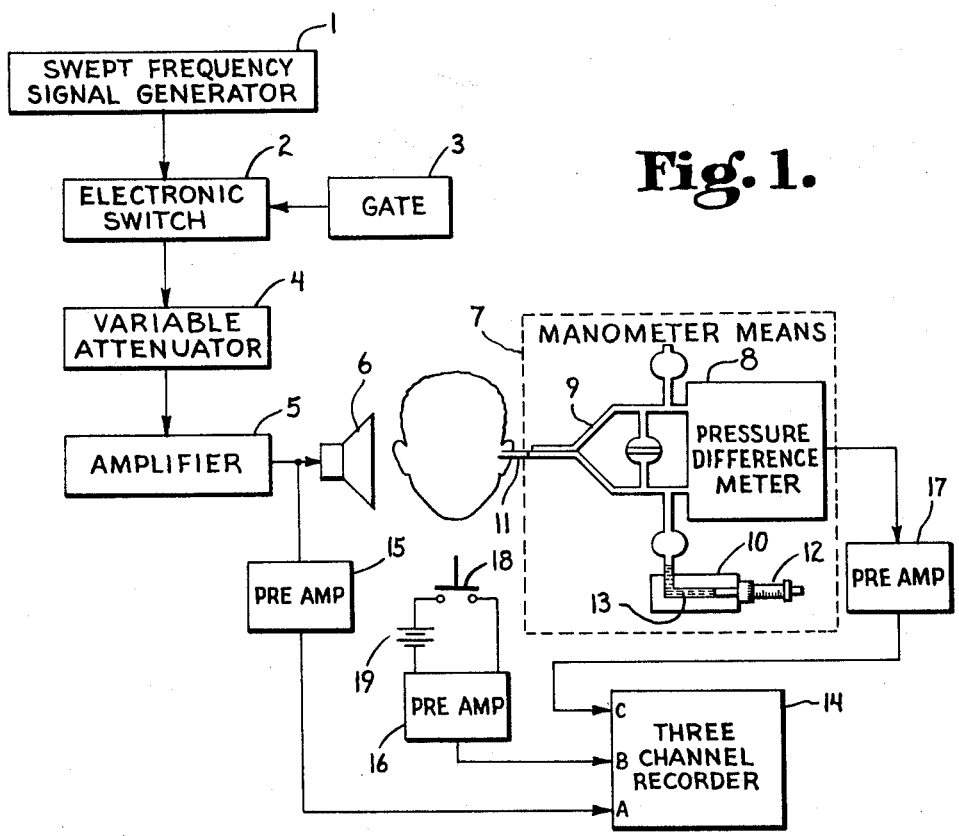
FIGURE 1 is a block diagram illustrating a combination of elements which form the desired middle ear muscle research testing means.

In the embodiment of the invention illustrated in FIGURE 1, the swept-frequency signal generator 1 is also known as an audiometer and may be comprised of a variable audio oscillator, slowly driven or swept by a motor which may be selectively turned on or off. The generator 1 may have an amplitude control which permits step changes in the decibel (db) output level. The output signal from generator 1 is coupled to an electronic switch 2 which either blocks the signal or passes it. Whether the electronic switch 2 is open or closed depends on a gate 3 which may be a multivibrator, thus giving the electronic switch 2 any desired duration of open period and closed period. The electronic switch 2 couples the signal through a variable attenuator 4 which may also be selectively driven by a motor, and an amplifier 5 to a speaker, earphone, or other like transducing means 6. A manometer means 7 comprising a differential pressure meter 8, a gas pressurized tube system 9, and a pressure calibrator 10, forms the means for detecting tympanic membrane motion. When properly calibrated, the manometer means 7 provides an electrical output proportional to the tympanic membrane movement in a subject's ear. One method of calibration is to set up a reference pressure in the reference tubing (upper portion of the tubing 9) of FIGURE 1. Then, after sealing a catheter tip 11, or other suitable means, in the subject's external auditory canal, the measuring tubing (lower half of the tubing 9), which is connected to the catheter tip 11, is pressurized to the exact amount of pressure as the reference tubing by manipulating the calibrating means. Very fine variations may be made by adapting a micrometer 12 to serve as a piston in controlling a column of mercury 13 thereby controlling the volume of the measuring tubing. The pressure differential meter 8 may then be nulled so that a signal of one polarity indicates a movement of the membrane in one direction and a signal of the other polarity indicates a membrane movement in the opposite direction. A three-channel recorder 14 is employed and the three input signals A, B, and C each couple through a preamplifier as illustrated by 15, 16, and 17. The inputs to the recorder 14 are from the amplifier 5, a push button 18, and the differential pressure meter 8, and they are coupled to the recorder 14 by the preamps 15, 16, and 17, respectively. The purpose of all three preamplifiers 15, 16, and 17, is to furnish a usable signal to the recorder 14; that is, a signal of proper amplitude and source impedance. The push button 18, when it is depressed, is shown to connect a battery 19 through the preamplifier 16 to the recorder 14 as input B, and the subject is instructed to push on the switch whenever he hears a sound.

A second generator (not shown) may be used in controlling the environment or test conditions of the experiment, if it is desirable to have a reference signal present. This reference signal could be present all the time; or, it could be gated so that it is present only during the "off" period of the stimulus tone.

In the operation of the testing means of FIGURE 1 electrical signals of varying frequencies and amplitudes are applied to the transducer 6 to produce acoustical signals in close hearing range of a subject. Some sounds, depending on frequency and amplitude, cause reflex motion of the middle ear muscles and these motions are detected by the manometer means. The subject is also able to indicate which sounds he hears by pressing the push button 18. In detail, the swept-frequency signal generator 1 puts out a slowly varying frequency which is gated through the electronic switch 2. The output of the switch is therefore a pulse or burst of frequency with a duration that is determined by the gate. The transducer 6 therefore produces a series of sounds of gradually increasing or decreasing frequency, depending on the direction in which the generator 1 is being swept, while the relation of "on" time to "off" time of the sound is determined by the gate 3. The signal to the transducer is free of spikes or transients since the switching is performed electronically. The amplitude of the signal is controlled by the variable attenuator 4 which is coupled to the amplifier 5 which drives the transducer 6. The signal amplitude may also be controlled by a switch (not shown) on the generator which, for example, may control the generator output level in 10 db or 20 db steps. Depending on the requirements of the experiment it may be necessary for the variable attenuator 4 to be driven by a motor. This would produce sound bursts of gradually increasing (or decreasing) frequency and gradually increasing (or decreasing) amplitude; or, either motor can be stopped allowing only one variable. Each of these variations may be described by the term "acoustic change." The signal that is coupled to the transducer 6 is also coupled through a preamplifier 15 to the recorder 14. In order to correlate and identify the pulses the recorder paper may be driven by the same motor that drives the generator or the attenuator.

Figure 2:
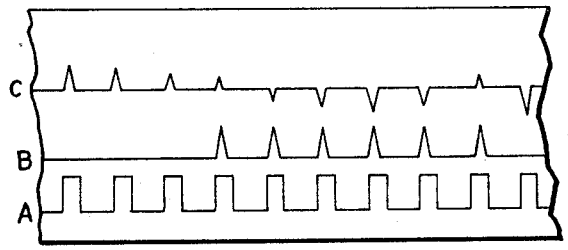
FIGURES 2 and 3 show representative recorder outputs from the recorder of FIGURE 1.

FIGURE 2 illustrates a representative recording where A shows the width and amplitude of each pulse fed to the transducer, B shows the pulses due to the subject's signal from the push button indicating he heard a sound, and C shows the direction and relative amplitude of tympanic membrane motion.

Figure 3:
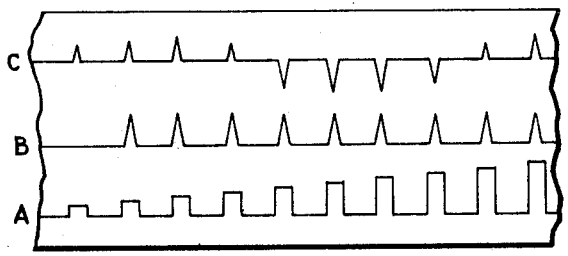

FIGURE 3 is a similar to FIGURE 2 but shows the condition where the amplitude of the stimuli is increased with each successive pulse.

It will be understood that various changes in the details, which have been herein described and illustrated in order to explain the nature of the invention, may be made by those skilled in the art within the principle and scope of the invention and I desire to be limited only in the scope of the appended claims.

I claim:
1. A means of simultaneously detecting a subject's hearing ability and tympanic membrane reflex motion, due to pulsed acoustical stimuli comprising:
   a signal generator means having a swept-frequency output of constant amplitude;
   an electronic switching means coupled to said signal generator means;
   a gating means coupled to said electronic switching means for opening and closing said electronic switching means, thereby causing said electronic switching means to have a pulsed signal output;
   a variable attenuator for controlling the amplitude of said pulsed signal output;
   an audio amplifying means coupled to said variable attenuator;
   a transducing means coupled to, and driven by, said amplifying means for converting the electrical energy output of said amplifying means to sound energy;
   a manometer means for measuring a pressure difference between a pressure in a tube coupled to a catheter tip which is adapted to be sealed in the external auditory canal of a subject, and a reference pressure, said manometer means having an output terminal for a manometer output voltage which is proportional to said pressure difference; and
   a three-channel recorder having one channel coupled to said manometer output terminal, having a second channel coupled to said amplifying means, and having a third channel coupled through a push button switch to a signal source, said push button switch adapted to be operated by a subject when the subject hears a sound.

2. A means of simultaneously detecting a subject's hearing ability and tympanic membrane reflex motion, due to pulsed acoustical stimuli as set out in claim 1 wherein
   said variable attenuator is selectively caused to sweep, thereby causing a series of pulses to be coupled to said amplifying means which are of slowly varying frequency and slowly varying amplitude.

3. A means of simultaneously detecting a subject's hearing ability and tympanic membrane reflex motion, due to pulsed acoustical stimuli as set out in claim 2 wherein
   said signal generator means is selectively caused to have a constant frequency output thereby causing a series of pulses to be coupled to said amplifying means which are of constant frequency and slowly varying amplitude.

4. A means of simultaneously detecting a subject's hearing ability and tympanic membrane reflex motion, due to pulsed acoustical stimuli as set out in claim 1 wherein
   said manometer means includes a calibrating means for adjusting the pressure in said catheter tip, said calibrating means coupled to said catheter tip by a tube which is coupled to a bore in a block which accepts a shaft of a micrometer, said bore and said tube containing a column of mercury the height of which is controlled by adjusting said shaft of said micrometer.

References Cited

UNITED STATES PATENTS

| | | | |
|---|---|---|---|
| 1,528,774 | 3/1925 | Kranz | 128—2 |
| 1,613,423 | 1/1927 | Wegel | 128—2 X |
| 2,072,705 | 3/1937 | Bloomheart | 179—1 |
| 2,217,394 | 10/1940 | Wengel | 179—1 |
| 2,705,742 | 5/1955 | Miller | 179—1 |

RICHARD A. GAUDET, *Primary Examiner.*

SIMON BRODER, *Assistant Examiner.*